(12) United States Patent
Xiao

(10) Patent No.: US 11,656,177 B2
(45) Date of Patent: May 23, 2023

(54) OPTICAL NANOSTRUCTURE SENSING DEVICE AND IMAGE ANALYSIS METHOD

(71) Applicant: Bo Xiao, Virginia Beach, VA (US)

(72) Inventor: Bo Xiao, Virginia Beach, VA (US)

( * ) Notice: Subject to any disclaimer, the term of this patent is extended or adjusted under 35 U.S.C. 154(b) by 292 days.

Patent file contains an affidavit/declaration under 37 CFR 1.130(b).

(21) Appl. No.: 16/865,802

(22) Filed: May 4, 2020

(65) Prior Publication Data

US 2021/0341386 A1 Nov. 4, 2021

(51) Int. Cl.
*G01N 21/552* (2014.01)
*B82Y 15/00* (2011.01)

(52) U.S. Cl.
CPC ........... *G01N 21/554* (2013.01); *B82Y 15/00* (2013.01)

(58) Field of Classification Search
CPC .... B82Y 15/00; G06V 10/751; G01N 21/554; G01N 2021/1765; G01N 2021/1789; G01N 21/4788; G01N 2201/122
See application file for complete search history.

(56) References Cited

U.S. PATENT DOCUMENTS

| | | | | |
|---|---|---|---|---|
| 7,705,280 B2 * | 4/2010 | Nuzzo | ................... | G01N 21/554 385/129 |
| 10,747,985 B2 * | 8/2020 | Xiao | ..................... | H04N 5/2256 |
| 10,824,846 B1 * | 11/2020 | Xiao | ....................... | G01N 21/59 |
| 2008/0212102 A1 * | 9/2008 | Nuzzo | ................... | G01N 21/554 359/321 |
| 2016/0033496 A1 | 2/2016 | Chou et al. | | |
| 2016/0146984 A1 | 5/2016 | Jiang et al. | | |
| 2017/0023711 A1 | 1/2017 | Jiang et al. | | |
| 2017/0199127 A1 * | 7/2017 | Xiao | ..................... | G01N 21/553 |
| 2019/0108385 A1 | 4/2019 | Xiao | | |
| 2020/0334445 A1 * | 10/2020 | Xiao | ....................... | G01N 21/59 |
| 2021/0285089 A1 * | 9/2021 | Xiao | ..................... | G01N 21/658 |

OTHER PUBLICATIONS

Bo Xiao, Christian G. Carvajal, Sangeeta Rout, "Encoding Multi-functional Nanostructured Metasurfaces,"arXiv:1709.02441v1 [physics. optics] Sep. 5, 2017 (Year: 2017).*

Bo Xiao, Gilbert Kogo, Gugu N. Rutherford, Messaoud Bahoura. "Plasmonic Pixel Biosensor Based on Grazing Angle Illumination and Computational Imaging." IEEE Sensors Journal vol. 19, No. 17, pp. 7313-7318. Date of Publication: May 6, 2019. Publisher: IEEE.

* cited by examiner

*Primary Examiner* — Violeta A Prieto

(57) ABSTRACT

The present invention relates to an optical nanostructure sensing device and an image analysis method. The image analysis method includes: illuminating a light beam from a predetermined incident angle onto a nanostructure pixel sensor; capturing images of the nanostructure pixel sensor when applying an analyte on the nanostructure pixel sensor; obtaining a relationship of periodic spacing and brightness from each of the images; and obtaining wavelength values from the relationship of periodic spacing and brightness at a predetermined brightness value; and determining a sensing process based on a wavelength shift of the wavelength values. The nanostructure pixel sensor includes a plurality of the nanostructure pixels, each of the nanostructure pixels includes periodic nanostructures, and the relationship of periodic spacing and brightness is based on the brightness of the nanostructure pixels having different periodic spacings.

17 Claims, 11 Drawing Sheets

OPTICAL NANOSTRUCTURE SENSING DEVICE AND IMAGE ANALYSIS METHOD

TECHNICAL FIELD

The present invention disclosure relates to chemical and biological sensing technologies, and in particular, to an optical nanostructure sensing device and imaging analysis method for sensing.

BACKGROUND

A collective oscillation of electrons bound to a metallic surface, surface plasmon resonance (SPR), has been utilized to detect biological, chemical, and biochemical substances and analyze real-time biomolecular interactions. The SPR technique measures changes in the refractive index in the vicinity of metallic thin films. The metallic films typically are made from noble metals such as gold and silver, whose free electrons support the propagation of evanescent waves at the metal/dielectric interface. The prominent feature gives rise to a highly sensitive technique for investigation of near-field variations of an analyte or molecule binding evens on the surface. SPR has gradually gained its acceptance as a standard label-free technique in biomedical science.

Over the past decades, there has been tremendous growth in SPR sensing. New strategies that exploit not only novel plasmonic materials but also new designs of metal nanoparticles or nanostructures to improve the SPR performance and expand its application in point-of-care diagnostics. However, the conventional SPR sensors based on the Kretschmann prism configuration are restricted to the laboratory environment due to its sensitive optical alignment and bulky instrumentation. The advance of nanotechnology made a significant paradigm shift to manipulate light-matter interactions from conventional bulky optical components to nanoscale structures. Metallic nanostructures can directly excite surface plasmon resonances, whereas the excitation of a planar metallic thin film in the traditional SPR sensing requires a prism to couple light from a specific angle of incidence.

Among a variety of nanostructures, nanohole arrays are the most studied structures for plasmonic sensing because their direct plasmon excitation and normal transmission operation dramatically simplify the optical alignment that shows the potential to realize the device-level integration. However, the fabrication of nanoholes, as well as many other engineered plasmonic nanostructures, involves sophisticated processes, which usually requires a micro- and nano-fabrication facility with costly equipment. In addition, these nanostructures are mostly restricted to qualitative detection rather than quantitative measurement for analyzing or monitoring biomolecule interactions in which bulky spectral instruments are still required.

SUMMARY

The present disclosure provides an image analysis method for plasmonic sensing applications. The image analysis method includes: illuminating a light beam from a predetermined incident angle onto a nanostructure pixel sensor; capturing images of the nanostructure pixel sensor when applying an analyte on the nanostructure pixel sensor; obtaining a relationship of periodic spacing and brightness from each of the images; and obtaining wavelength values from the relationship of periodic spacing and brightness at a predetermined brightness value; and determining a sensing process based on a wavelength shift of the wavelength values. The nanostructure pixel sensor includes a plurality of the nanostructure pixels, each of the nanostructure pixels includes periodic nanostructures, and the relationship of periodic spacing and brightness is based on the brightness of the nanostructure pixels having different periodic spacings.

Optionally, the image analysis method further includes capturing at least one image of the nanostructure pixel sensor, before applying the analyte on the nanostructure pixel sensor before capturing the images of the nanostructure pixel sensor.

Optionally, the images of the nanostructure pixel sensor are captured by an image sensor at a predetermined time interval.

Optionally, the sensing process based on the wavelength shift of the wavelength values detects molecular absorption of the analyte.

Optionally, each of the wavelength values is obtained from an interpolated curve based on the relationship of periodic spacing and brightness.

Optionally, before obtaining the wavelength values from the relationship of periodic spacing and brightness at the predetermined brightness value, the image analysis method further includes calibrating the relationship of periodic spacing and brightness of each of the images based on a baseline.

Optionally, before obtaining the wavelength values from the relationship of periodic spacing and brightness at the predetermined brightness value, the method further includes normalizing the relationship of periodic spacing and brightness of each of the images.

Optionally, the wavelength values obtained from the relationship of periodic spacing and brightness at the predetermined brightness value are obtained from one side of a peak in the relationship of periodic spacing and brightness.

Optionally, the light beam illuminates the nanostructure pixel sensor from a small angle between the light beam and a surface of the nanostructure pixel sensor, and the small angle is less than 10°.

Optionally, the light beam is emitted from a side of the nanostructure pixel sensor opposite away from the nanostructure pixels, and the nanostructure pixel sensor is transparent or semi-transparent.

Optionally, the light beam is emitted from a side of the nanostructure pixel sensor, the images of the nanostructure pixel sensor are captured from an opposite side of the nanostructure pixel sensor, and the nanostructure pixel sensor is transparent or semi-transparent.

Optionally, a metallic thin film of the nanostructure pixels has a thickness within a range of 40 to 60 nm.

Optionally, the periodic spacings are in a range of 400 nm to 900 nm, and a wavelength of the light beam is in a range of 400 nm to 900 nm.

Optionally, determining the sensing process based on the wavelength shift of the wavelength values determines a presence and/or amount of the analyte captured on the nanostructure pixel sensor.

Optionally, images taken from a known analyte are used to determines the presence and/or amount of the analyte captured on the nanostructure pixel sensor.

Optionally, the nanostructure pixels include the periodic nanostructures arranged in different directions.

Optionally, each of the nanostructure pixels includes a plurality of arrays of the periodic nanostructures, and each of the arrays of the periodic nanostructures has a different periodic spacing.

DETAILED DESCRIPTION

An optical nanostructure sensing device is a chemical or biological sensor, which includes nanostructure pixels. A nanostructure pixel or plasmonic pixel is a minute area of a periodic nanostructure array that is lit or dimmed depending on its plasmonic response under the illumination of light. Periodic plasmonic nanostructures interact with light from an incident angle. Varying periodicity of these nanostructures affects the plasmonic response for the transmitted, reflected, or scattered light from the nanostructures. The diffraction on a periodic structure satisfies the wavevector conservation to excite surface plasmon polaritons (SPPs): $\vec{K}_{spp} = \vec{K}_i \pm n(2\pi/P)$, where $\vec{K}_{spp}$ is the surface plasmon wavevector, $\vec{K}_i$ is the incident light wavevector at the direction of $\vec{K}_{spp}$, P is the periodicity, and n is an integer number of the grating order. The equation defines the Bragg coupling condition of SPP excitation. The interaction between the SPP modes and the periodic nanostructures involves coupled oscillations that usually generate asymmetric Fano resonances. If the nanostructures are negligibly small compared to the resonant wavelength, the collective oscillations along the periodic nanostructures could be considered as a dipole chain. The coherent resonance of the dipole chain and Bragg interference between the scattered fields give rise to a discrete energy state with strong Fano interference that is analogous to the behavior of a single dipole emitter inside a cavity. The dipole inside the cavity mirror represents the existence of cooperative dipole-dipole interaction, and the half-decay rate can be written as:

$$\gamma = \frac{3\pi\gamma_0}{k_0 a}\left[\frac{1}{2} + \sum_{n=0}^{[k_0 a/\pi]} \left(1 - \frac{n^2 \pi^2}{k^2 a^2}\cos^2\left(\frac{n\pi}{2}\right)\right)\right]$$

where $k_0 = \omega_0/c$, $\omega_0$ is the transition frequency, $[k_0 a/\pi]$ is the greatest integer part of $k_0 a/\pi$, n is the cavity mode index, a is the mirror spacing, and $\gamma_0$ is the half-decay rate of a single atom in free space. As the resonant wavelength matches the spacing a, the cooperative behavior results in the fully in-phase vibration mode with a minimum of the decay rate. For non-radiative SPPs, a periodic plasmonic structure yields the highest efficiency when the wavelength of plasmonic resonance is equal to the periodic spacing.

The dipole-chain model is an ideal case of the interactions between the periodic nanostructures and plasmonic resonances. In practice, plasmonic nanostructures are fabricated on a supporting material or a substrate whose dielectric property affects the frequency of the plasmonic resonance. When the plasmon resonance mainly depends on the periodic spacing instead of the dielectric of the substrate, the result may well fit the model.

Figure 1A:
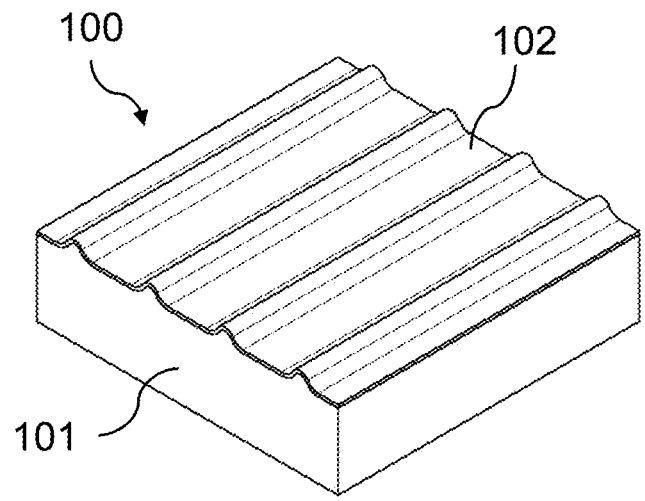
FIGS. 1A and 1B are schematic diagrams of nanostructured thin films.
Figure 1B:
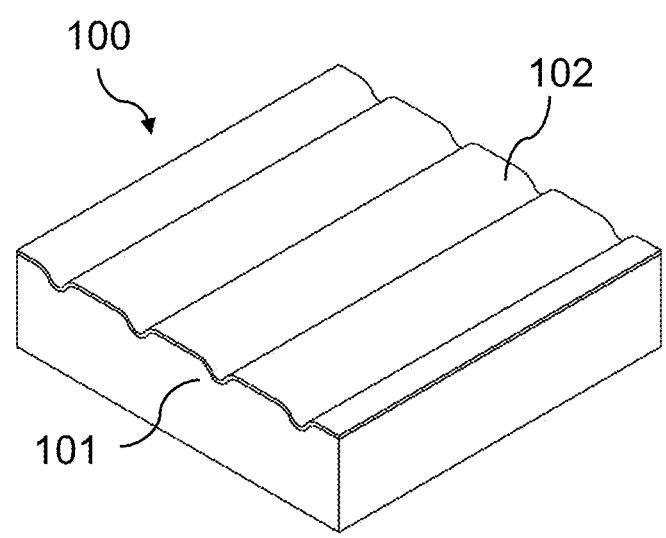

The nanostructure pixels possess a structure based on a nanostructured thin film. As illustrated in FIGS. 1A and 1B, the structure is a surface relief with nanoscale elevations or depressions on a substrate. The surface relief is covered by a continuous metal thin film to separate two interfaces: metal and supporting material, and metal and air. Plasmonic metals such as Ag or Au are the top layer for exciting surface plasmon polaritons.

In one embodiment of the present invention, the nanostructure pixel includes a substrate 101 having an array of periodic nanostructures and a metallic thin film 102. The array of periodic nanostructures forms a grating structure. The nanostructures are an elevation surface relief in FIG. 1A and a depression surface relief in FIG. 1B. The periodic nanostructures may be fabricated directly on a substrate or on one or more intermediate layers on a substrate. The materials used for the substrate and intermediate layers may be glass, silicon, or polymers such as poly(methyl methacrylate) (PMMA), polycarbonate, polystyrene, or cyclic olefin copolymers. The metallic thin film 102 is deposited on the array of periodic nanostructures by evaporation, sputtering, electroplating or any other appropriate method. The metallic thin film 102 may be composed of gold, silver, and metal that can excite surface plasmon resonances.

Figure 2A:
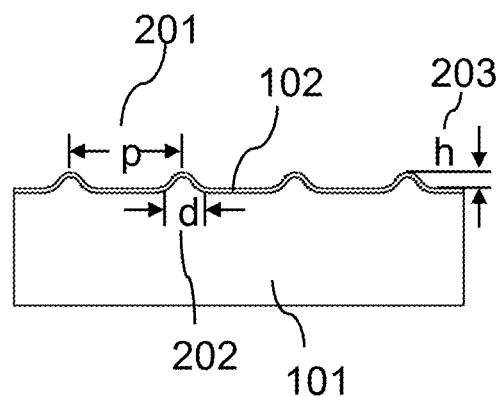
FIGS. 2A and 2B are schematic cross-section views of nanostructure pixels.
Figure 2B:
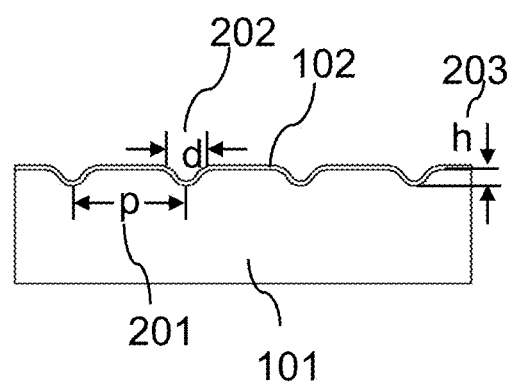

Nanofabrication techniques generally involve lift-off and dry etching processes, which unavoidably introduce sharp edges, corners, and rough surfaces that cause unwanted scattering losses and low plasmonic coupling efficiency. In order to increase efficiency, the nanostructures have rounded corners and edges, as illustrated in FIGS. 2A and 2B. The smooth profile of the nanostructures can be obtained during or after the fabrication of the array of periodic nanostructures using a heating or wet etching process. The smoothing process alleviates structural discrepancies and thus improves coherent plasmonic resonances.

The preferred thickness of the metallic thin film 102 is 10-60 nm. The periodic spacing p 201 between the nanostructures may be about 400-1000 nm. The width d 202 of the nanostructures may be less than 100 nm or less than 20% of the periodic spacing p 201. The height h 203 of the nanostructures may be about 20-300 nm. The periodicity and smooth profile of the periodic array allow the nanostructure pixels to have wavevectors closely matched with the incident light that excites a coherent SPR. Ideally, the maximum brightness of a nanostructure pixel illuminated by light with a wavelength λ can be achieved when p≈λ, where p is the periodic spacing 201 and λ is the wavelength of light. Although the incident angle of light, observation angle, and fabrication errors may cause an offset of p and λ, the detection of the nanostructure pixel sensor is almost independent of the offset, for the detection mainly relies on a change of the image pattern that is a relative change.

Figure 3A:
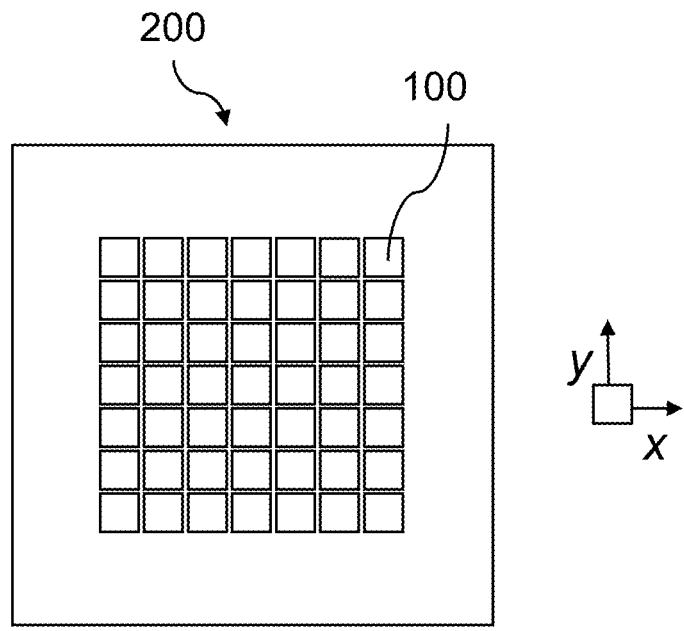
FIGS. 3A and 3B are schematic diagrams of nanostructure pixel sensors.
Figure 3B:
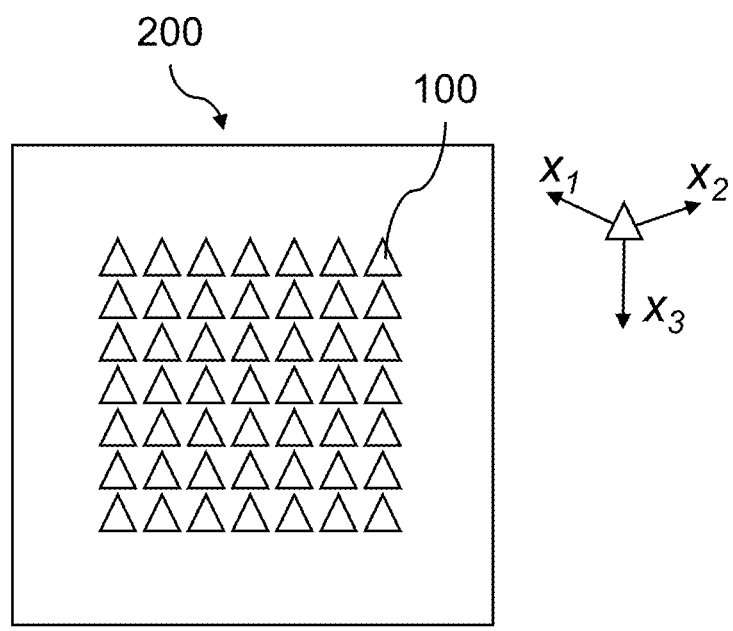

There are a variety of ways to arrange the nanostructure pixels for sensing and imaging applications. For example, nanostructure pixels having the periodic spacings from 400 to 899 nm with a 1 nm increment can be arranged in a nanostructure pixel sensor to respond to light having a wavelength in a range of 400 to 899 nm. Moreover, a nanostructure pixel may have different shapes, and the orientations of periodic nanostructures in one nanostructure pixel may vary. FIG. 3A illustrates a matrix of square nanostructure pixels 100. The periodic nanostructures may be arranged along the direction of x or y, or the periodic nanostructures along the directions of x and y may both be arranged in a nanostructure pixel. FIG. 3B illustrates a matrix of triangle nanostructure pixels 100. The periodic nanostructures may be arranged along with the directions of $x_1$, $x_2$, and $x_3$, or the periodic nanostructures along the directions of $x_1$, $x_2$, and $x_3$ may all be placed in a nanostructure pixel. Likewise, polygon nanostructure pixels may be used in a nanostructure pixel sensor. The flexible arrangement in shape and orientation allows light to emit from different directions. Also, since periodic nanostructures respond strongly along the illuminating direction of a light beam, a polygon nanostructure pixel may be used as a calibration pixel to determine the direction of the incident light beam.

Figure 4A:
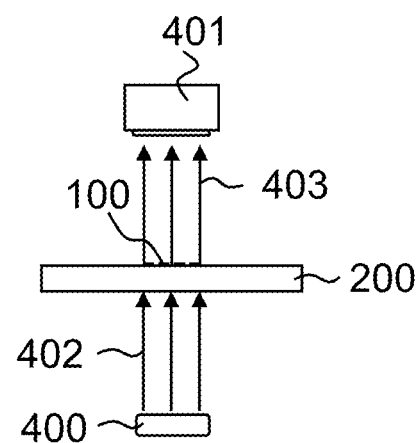
FIGS. 4A and 4B are schematic diagrams of sensing configurations for nanostructure pixel sensors.
Figure 4B:
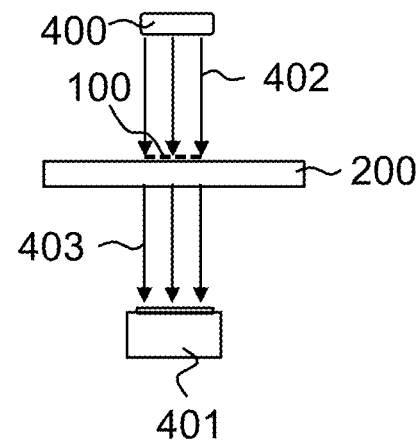

FIGS. 4A and 4B illustrate a sensing configuration in one embodiment of the present invention. A light source 400 generates polarized or non-polarized single wavelength or narrow-band wavelength light. If the light sources 400 in FIGS. 3A and 3B are polarized, the magnetic field vector of the light may be perpendicular to the grating vector. That is, the electric field vector of the light is along the direction of the periodic nanostructures. The incident light beam 402 illuminates the nanostructure pixels 100 from one side of the nanostructure pixel sensor 200. The transmitted light 403 is collected by an image sensor 401 such as a camera to obtain an image of the nanostructure pixels 100. In the transmission configuration, a transparent or semi-transparent substrate is used in the nanostructure pixel sensor.

Analytes sought to be detected are brought in contact with or in the vicinity of the metallic thin film surface of the nanostructure pixels. These analytes change the local refractive index around the nanostructures, which affect the constructive or destructive interferences of the surface plasmon and evanescent electromagnetic waves. Therefore, the nanostructure pixels light up or dim when the analytes are altering the environment. The detection is based on a change or difference of the light before and after capturing an analyte on the nanostructure pixels. Although two interfaces interact with the incident light and generate their plasmonic responses, the interface between the dielectric substrate and metallic nanostructure thin film could not significantly affect the sensing ability of the opposite interface, because the dielectric substrate has a constant and relatively large refractive index.

Figure 5A:
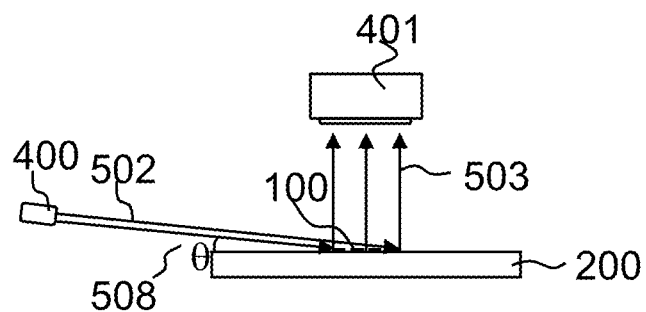
FIGS. 5A and 5B are schematic diagrams of sensing configurations for nanostructure pixel sensors.
Figure 5B:
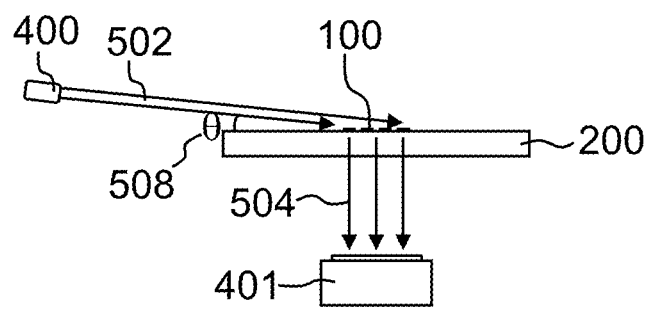

The light signals from the nanostructure pixels are collected by an image sensor when a light source operates in a transmission mode, a reflection mode, or a combination of both. The incident and detected light can be set perpendicular or with a certain angle to the surface of the nanostructure pixel sensor. FIG. 5A illustrates an alternative sensing configuration, wherein the incident light beam 502 illuminates the nanostructure pixels 100 from one side of the nanostructure pixel sensor 200 and scattered light 503 is collected by an image sensor 401 to obtain an image of the nanostructure pixels 100. In this sensing configuration, the nanostructure pixel sensor may be non-transparent, for the incident light beam 502, the image sensor 401, and the nanostructure pixels are disposed at the same side of the nanostructure pixel sensor 200. FIG. 5B illustrates another alternative sensing configuration, where the incident light beam 502 illuminates the nanostructure pixels 100 and scattered and transmitted light 504 is collected by an image sensor 401 from the backside of the nanostructure pixel sensor 200. The directions of the incident light beams 502 in FIGS. 5A and 5B are along the direction of the periodic nanostructures. A component of the electric field of the light beam 502 is along the direction of the periodic nanostructures. Moreover, the incident angle θ 508 of the light beam 502 is small, preferably less than 10°. The small incident angle allows even a light beam with a small diameter to cover a much large area. Besides, small-angle incidence let the strongest plasmonic response occur in the periodic nanostructures with a periodic spacing close to the wavelength of the light beam ($\lambda \approx p \cos \theta$). When the incident angle θ is small, $\lambda \approx p$. In optics, this small angle incidence is referred to as grazing incidence in a condition where an incident light ray makes an angle of almost 0° to a surface or almost 90° from the normal of the surface.

Figure 6A:
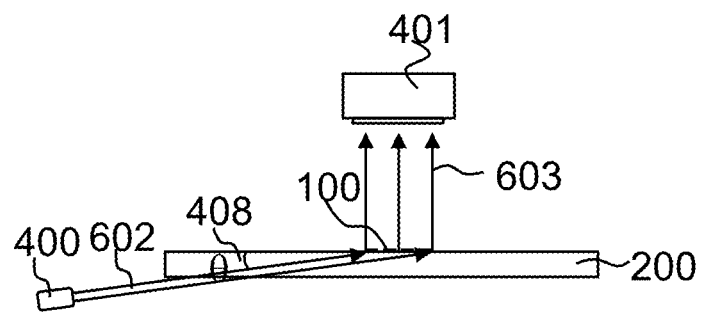
FIGS. 6A and 6B are schematic diagrams of sensing configurations for nanostructure pixel sensors.
Figure 6B:
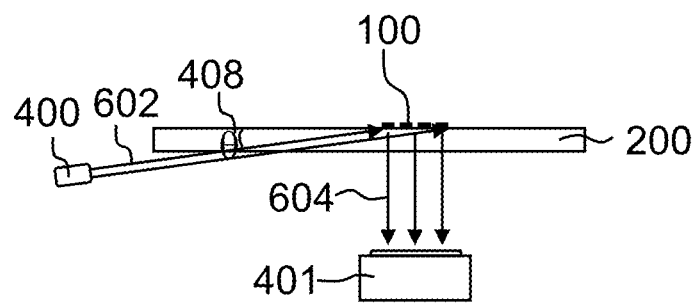

In one embodiment of the present invention, the light may emit from the backside of the nanostructure pixel sensor at a small or grazing angle. FIG. 6A illustrates a sensing configuration. The incident light beam 602 illuminates the nanostructure pixels 100 from the backside side of the nanostructure pixel sensor 200, and scattered light 603 is collected by an image sensor 401 to obtain an image of the nanostructure pixels 100. FIG. 6B illustrates another alternative sensing configuration. The incident light beam 602 illuminates the nanostructure pixels 100, and scattered and transmitted light 604 is collected by an image sensor 401 from the backside of the nanostructure pixel sensor 200. The directions of the incident light beam and its electric field are similar to the configuration as described in FIGS. 5A and 5B.

In one embodiment of the present invention, the substrate may be non-transparent if the light beam illuminates the nanostructure pixels from the same side of the nanostructure pixels on the substrate, and scattered light is also collected from that side. When the light beam illuminates the nanostructure pixels from a side of the substrate, and the scattered light is collected from an opposite side of the substrate, the substrate is transparent or semi-transparent. To achieve good transparency and plasmonic responses, the thickness of the metallic thin film may be in a range of 40 nm to 60 nm.

Figure 7A:
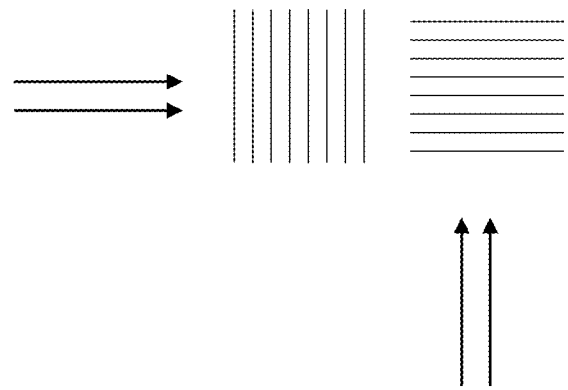
FIGS. 7A and 7B are schematic diagrams of incident light beam configurations.
Figure 7B:
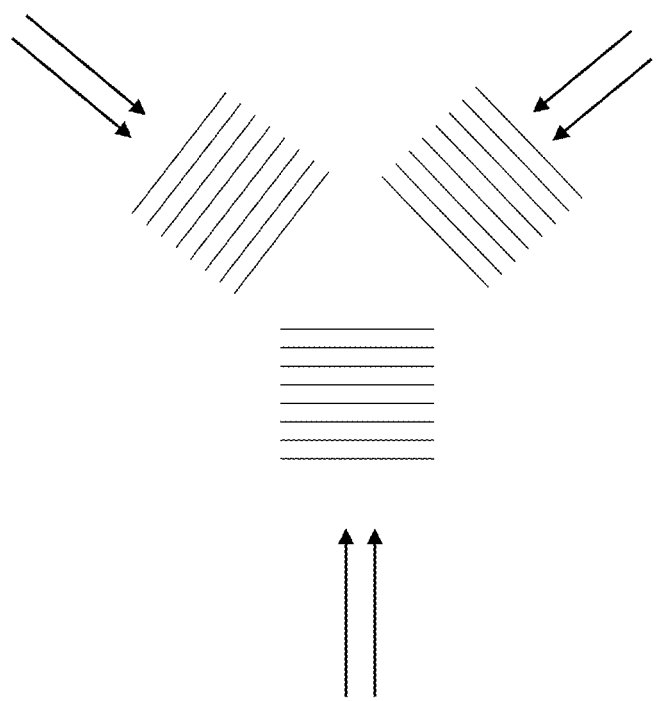

FIGS. 7A and 7B illustrate the incident direction of light rays related to the periodic nanostructures in a small angle incidence configuration, where the arrows represent the incident direction of light rays and line arrays represent the periodic nanostructures. The light rays are aligned perpendicular to a nanostructure or along the periodic direction of the nanostructures. Therefore, periodic nanostructures may be arranged in different orientations. Such an arrangement allows multiply light sources to create different plasmonic images for sensing.

Figure 8:
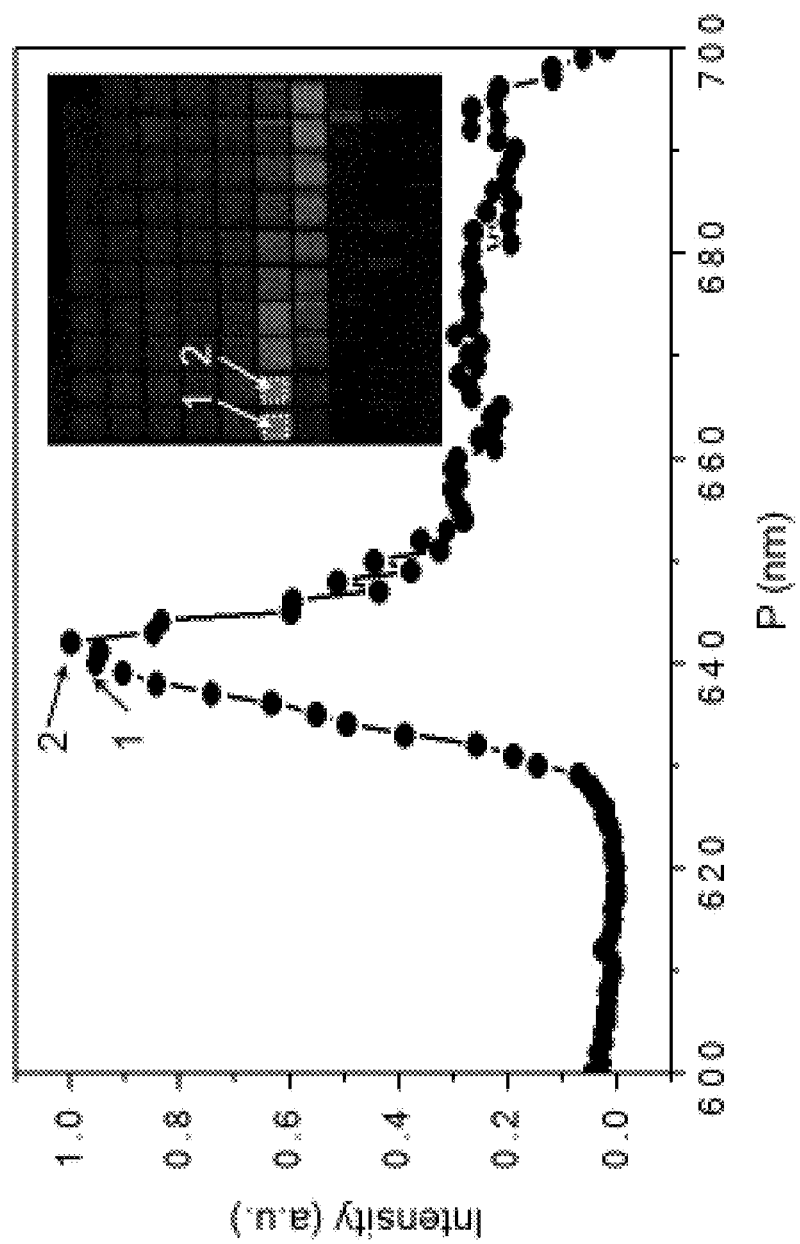
FIG. 8 shows a plot of extracted data from an image taken from a nanostructure pixel sensor.

FIG. 8 demonstrates an exemplary method to plot a function of pixel periodic spacing vs pixel intensity (or brightness). The inset of FIG. 8 is a digital camera photo of nanostructures pixels illuminated by a 650 nm laser beam. The layout of the pixels was designed to respond to light with wavelengths in the range of visible and near-infrared range from 400 to 899 nm. The nanostructure pixels have the periodic spacings from 400 to 899 nm with a 1 nm increment. Those nanostructure pixels can be arranged in a variety of formats. The arrangement may be a simple matrix or other predetermined patterns. For example, the periodic spacings of the nanostructure pixels are 400 nm, 401 nm, . . . , 409 nm in the first row, 410 nm, 411 nm, 419 nm in the second row, and so on. Because plasmonic responses are related to the periodic spacing, nanostructure pixels show different brightness when illuminated by a single wavelength light ray. Therefore, the relative brightness of the nanostructure pixels provides plasmonic response information of the nanostructure pixels. In one embodiment of the present invention, brightness values inside the individual pixels are extracted to determine its plasmonic response intensity. If the digital image is an RGB format, the values of the red channel can be used to represent the brightness for the 650 nm light source. The green or blue channel can also be used to extract the brightness as a reference for brightness calibration in situations such as the red channel is saturated. As shown in the inset of FIG. 8, the RGB values of all points in the squares 1 and 2 are extracted from the digital image, and then averaged and normalized to obtain the points in the curve of FIG. 8. The curve establishes a relationship between the periodic spacings and brightness of the nanostructure pixels. The plots of the relationship between periodic spacing and brightness can be utilized to track changes of the surface plasmonic resonance on the nanostructure pixels.

In FIG. 8, the peak of the curve locates around 640 nm, that is, a nanostructure pixel with a periodic spacing of 640 nm gains a strongest plasmonic response, which is also the brightest pixel. Because of fabrication error, incident angle, and observation angle, it is common that there exists such an offset between the periodic spacing and the wavelength of the light source.

Figure 9:
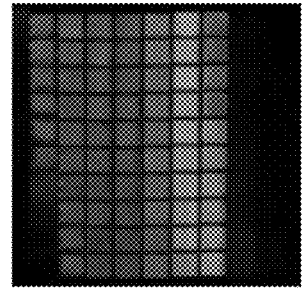
FIG. 9 shows images taken from a nanostructure pixel senor illuminated by light beams with wavelengths of 420, 532, 650, and 808 nm.
Figure 9:
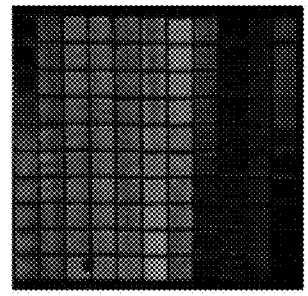
Figure 9:
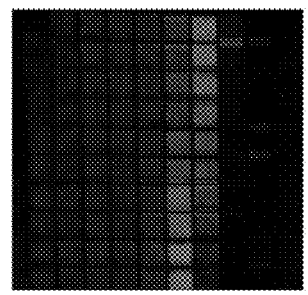
Figure 9:
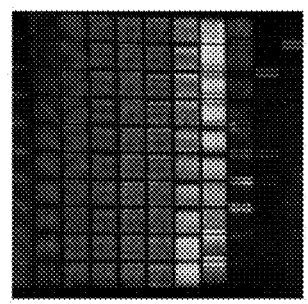
Figure 10:
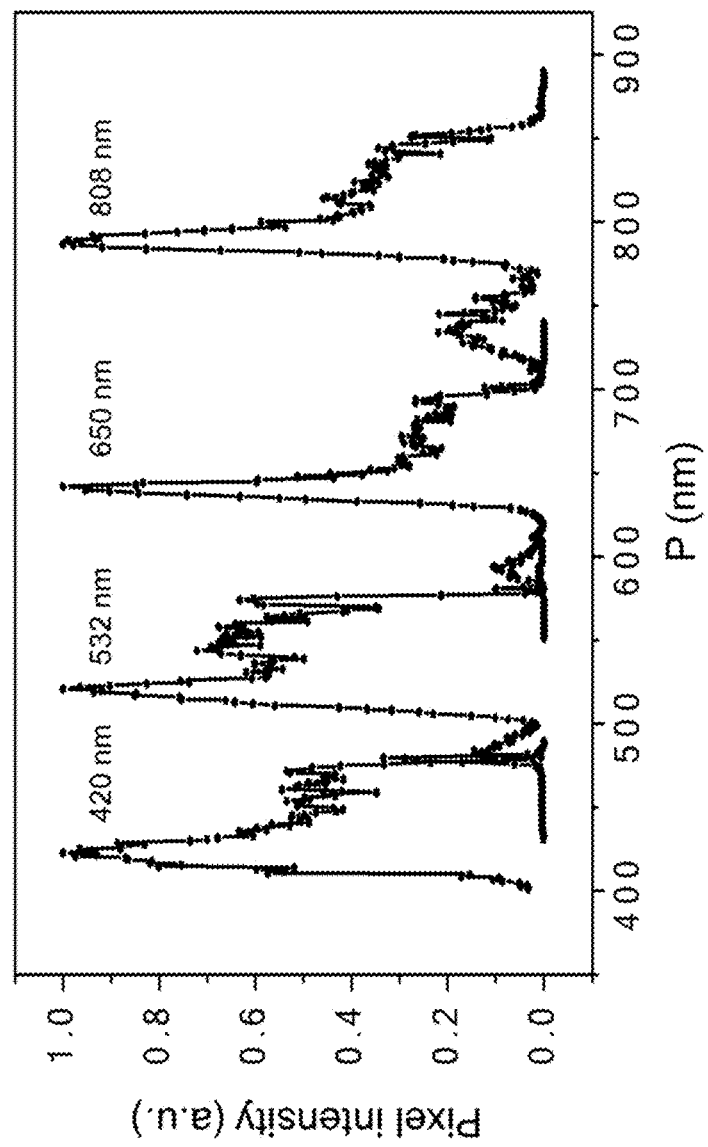
FIG. 10 shows plots of extracted data from images taken from a nanostructure pixel sensor.

FIG. 9 shows the images of nanostructure pixels illuminated by laser diode sources with wavelengths of 420, 532, 650, and 808 nm. FIG. 10 shows the corresponding intensity plots in which the intensity values or brightness information are extracted from the images of FIG. 9. The intensity plots exhibit an asymmetric Fano resonance behavior with sharp intensity peaks. A Fano resonance is a special resonance that occurs as a result of interferences between a discrete quantum state and a continuum of states. In optics, the Fano resonance causes a sharp transition from the transmission or reflection to absorption. The sharp transition is manifested in the absorption, transmission, and reflection spectra as an asymmetric line-shape defined by the famous Fano formula: $\delta(\varepsilon)=(\varepsilon+q)^2/(\varepsilon^2+1)$, where q is the Fano parameter that determines the asymmetry of the profile, E is the reduced energy and defined as $2(E-E_d)=\Gamma_d$, $E_d$ is the discrete state, and $\Gamma_d$ is the width. The discrete state $E_d$ is induced by the excited SPPs, which interacts with the scattered light (the continuum of states).

Digital camera images provide spectral characteristics of these nanostructure pixels resulting from the cooperative SPRs and diffraction. Periodic nanostructures in one dimension is a diffraction grating, which satisfies the general grating equation: $m\lambda=d(\sin\theta_i+\sin\theta_r)$, where m is the diffraction order, and a light beam with a wavelength of $\lambda$ is incident onto a diffraction grating with a periodic spacing of d at an angle $\theta_i$ and diffracted at $\theta_r$. Consider a plane wave incident from a small angle ($\sin\theta_i\approx1$) in the grazing angle incidence. Constructive interference occurs at the surface normal when $d\approx\lambda$. And the cooperative plasmon resonances introduce a discrete energy state that interferes with the diffraction. Therefore, it should be noted that there is a fundamental difference between the non-plasmonic and plasmonic gratings. The plasmonic phenomenon is polarization-dependent, which occurs only for the TM (transverse magnetic) polarized light whose incident and grating vector are in the same plane, and the magnetic field of the incidence is perpendicular to the plane. Spectral peaks of non-plasmonic gratings entirely come from constructive interference of the diffraction, which are broad and lack the asymmetric feature. Besides, since the observation direction is perpendicular to the sample surface, the grazing angle incidence reduces the strong background signal from the light source. Therefore, the brightness of the nanostructure pixels predominantly depends on the interference of SPRs and diffraction.

Figure 11:
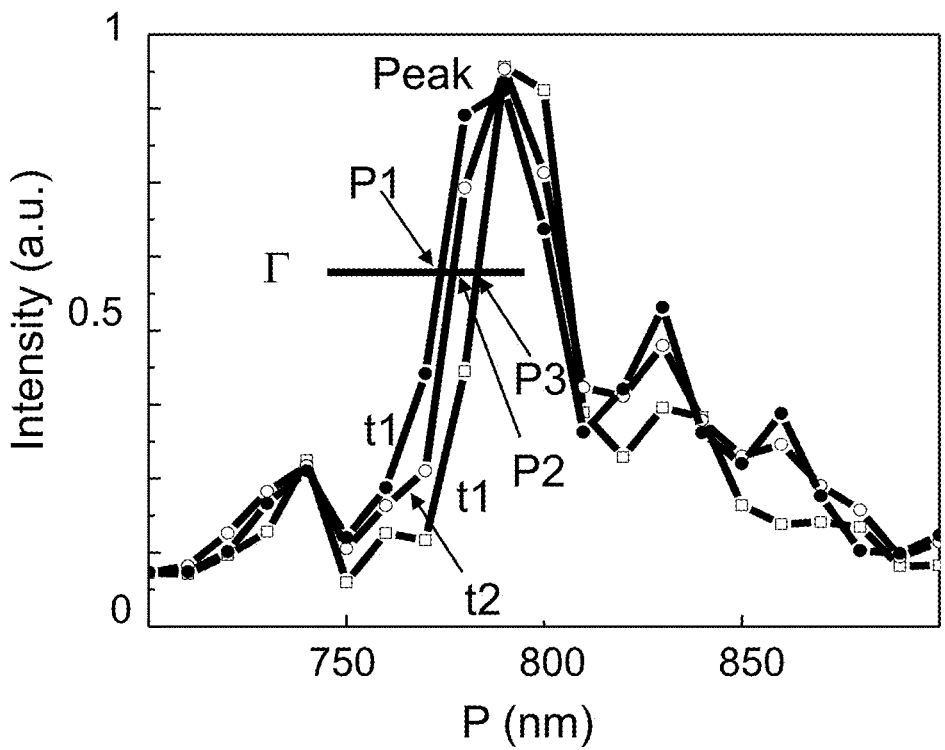
FIG. 11 shows plots of extracted data from images taken from a nanostructure pixel sensor.

The pixel biosensor can perform real-time monitoring of molecular interactions. To achieve such an analytic function with high accuracy, the conventional plasmonic sensing based on wavelength-shift usually requires a precision spectrometer. One embodiment of the present provides a method for performing real-time sensing. When chemical or biologic reactions occur in the vicinity of the surface of the nanostructure pixel sensor, the reactions affect the plasmonic responses of the nanostructure pixels that result in changes in the brightness of the nanostructure pixels. Correspondingly, the intensity curves shift from their original positions. Shifts in the intensity curves due to the brightness changes of the nanostructure pixels can detect chemical or biological analytes and even monitor molecular adsorption in real time, such as polymers, DNA or proteins. The intensity curves have a Fano resonance line shape and a sharp peak with a steep edge. Therefore, the edge shift can be quantified to represent the sensing process. FIG. 11 shows plots of extracted data from images taken from a nanostructure pixel sensor during sensing. For example, three intensity curves are obtained at time t1, t2, and t3 from a nanostructure pixel sensor during a sensing process. At the intensity level F, three position values (or wavelength values) of P1, P2, and P3 can be obtained from the interpolated curves. Thus, plotting the position values vs. time can provide a curve representing the sensing process.

Figure 12:
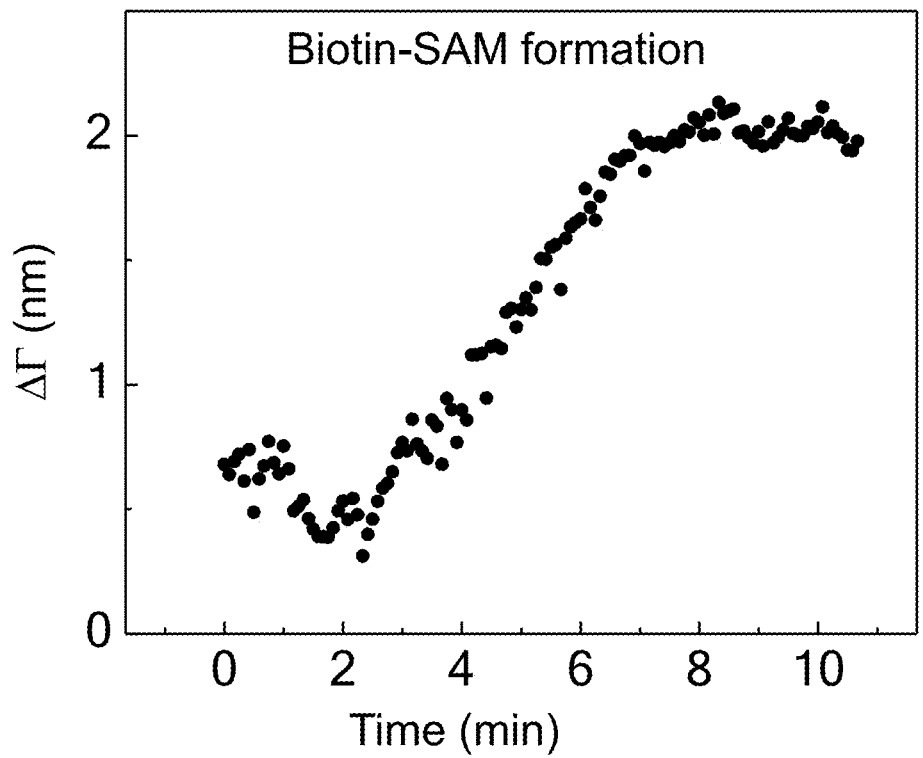
FIG. 12 shows a plot of wavelength shift vs time.

FIG. 12 shows a plot of wavelength shift vs. time. The shift plot of the nanostructure pixel sensor were obtained for the formation of biotin-SAM (biotin self-assembled monolayer). A digital camera for capturing the images of the nanostructure pixels was set at a full manual mode with fixed exposure parameters, e.g., shutter time, auto white balance, digital and analog gain. After warm-up and calibration of the camera, time-lapse images were taken in a small or grazing angle configuration with the sensor chip illuminated by an 808 nm laser diode. The formation process of the self-assembled monolayer (SAM) occurs on the surface of the nanostructure pixel sensors. The commercial biotin-SAM formation reagent was used in the test, and the operation followed its preparation protocol. Before the injection of the SAM formation reagent solution, the sensor chip mounted with a microfluidic flow cell was filled with ethanol that is used to dissolve the Biotin-SAM reagent. As shown in FIG. 12, the biotin-SAM started binding to the sensor surface after 2 min of the injection and reached its saturation around 7 min. The results suggest that nanostructure pixel sensing is capable of performing kinetics analysis. The shifts from the pixel patterns provide a simple but accurate method to analyze molecular interactions without the precision spectral instrument.

One embodiment of the present invention provides an image analysis method for plasmonic sensing. The method includes the following steps:

S10. A light beam illuminates a nanostructure pixel sensor from a predetermined incident angle. The light beam may be emitted from a light source with a single wavelength or a narrow-band wavelength, such as a laser diode. A small or grazing angle incidence is more desirable since it can cover a large surface area.

S20. An image sensor may be used to take pictures of the nanostructure pixel sensor. The pictures can be taken at a predetermined time interval during a sensing process. In a simple detection, the pictures may be taken before and after an analyte is applied on the nanostructure pixel sensor. In real-time monitoring, starting before an analyte is applied, the pictures may be taken continuously at a time interval. The analyte may be in a solution that is in contact with the nanostructure pixels. The analyte is absorbed or captured by the surface of the nanostructure pixel sensor, which changes the plasmonic responses of individual nanostructure pixels. Plasmonic response information is then extracted from the pictures of the nanostructure pixels.

S30. The images provide information about plasmonic responses. Brightness values of the nanostructure pixels are extracted from the images, which can be used to establish a relationship of periodic spacing and brightness. The nanostructure pixels have different periodic spacings coving a range of wavelengths. For example, the periodic spacings can start at 400 nm and the maximum of the periodic spacing is 899 nm. With a 1 nm increment, 500 nanostructure pixels may approximately cover plasmonic resonances in a wavelength range of 400 to 899 nm. The brightness values and their corresponding periodic spacings establish a relationship to detect the sensing process. The relationship may be a function of pixel periodic spacing vs pixel brightness of a nanostructure pixel sensor. The data of the relationship may fluctuate due to noise or vibration in the image sensor or light source. Therefore, the data may be calibrated from a baseline or be normalized to set a limit in a range. Moreover, multiply images taken in a short time may be processed such as averaging and combining to improve the image quality.

S40. The intensity of the brightness (or wavelength values) can be extracted from the relationship of periodic spacing and brightness at a predetermined brightness level. The predetermined brightness level is an intensity value y, which is selected between the maximum and minimum of the intensity values. If y is between $y_1$ and $y_2$ ($y_1 \leq y \leq y_2$) where $y_1$ and $y_2$ are intensity values of two nanostructure pixels having periodic spacings $x_1$ and $x_2$, respectively. Linear interpolation between the points ($x_1$, $y_1$) and ($x_2$, $y_2$) can determine a point (x, y), where a position value x is the wavelength at the intensity value y. Hence, x may not be an integer that increases the precision level to determine the sensing progress.

S50. The intensity of the brightness (or wavelength values) can reveal a sensing process based when the wavelength values shift at different times. Thus, the wavelength shift of the wavelength values detects molecular absorption of the analyte. Also, images can be compared to inspect whether there is any difference in the nanostructure pixels before and after an analyte is applied. Images taken from a pre-examined analyte may be used as a reference so that comparing those images can determine the presence and amount of the analyte on the surface of the nanostructure pixel sensor.

A person skilled in the art may further be aware that the units and algorithm steps in the examples described with reference to the embodiments disclosed in this specification may be implemented by electronic hardware, computer software, or a combination thereof. To clearly describe the interchangeability between hardware and software, the foregoing has generally described compositions and steps of each example based on functions. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

In the foregoing specific implementations, the objective, technical solutions, and benefits of this application are described in detail. It should be understood that the foregoing descriptions are merely specific implementations of this application, but are not intended to limit the protection scope of this application. Any modification, equivalent replacement, or improvement made without departing from the spirit and principle of this application should fall within the protection scope of this application.

What is claimed is:

1. An image analysis method of plasmonic sensing, comprising:
    illuminating a light beam from a predetermined incident angle onto a nanostructure pixel sensor;
    capturing images of the nanostructure pixel sensor when applying an analyte on the nanostructure pixel sensor;
    extracting a series of brightness values that have a relationship of periodic spacing and brightness from each of the images, wherein the brightness values are based on light intensities individually extracted from a plurality of nanostructure pixels, a light intensity is extracted from each of the nanostructure pixels, and a periodic spacing of a nanostructure pixel corresponds to a light intensity of the nanostructure pixel;
    obtaining wavelength values from the relationship of periodic spacing and brightness at a predetermined brightness value; and
    determining a sensing process based on a wavelength shift of the wavelength values;
    wherein the nanostructure pixel sensor includes the nanostructure pixels, each of the nanostructure pixels includes periodic nanostructures, and the relationship of periodic spacing and brightness is based on the brightness of the nanostructure pixels having different periodic spacings.

2. The image analysis method according to claim 1, further comprising:
    capturing at least one image of the nanostructure pixel sensor before applying the analyte on the nanostructure pixel sensor, before capturing the images of the nanostructure pixel sensor.

3. The image analysis method according to claim 1, wherein the images of the nanostructure pixel sensor are captured by an image sensor at a predetermined time interval.

4. The image analysis method according to claim 3, wherein the sensing process based on the wavelength shift of the wavelength values detects molecular absorption of the analyte.

5. The image analysis method according to claim 1, wherein each of the wavelength values is obtained from an interpolated curve based on the relationship of periodic spacing and brightness.

6. The image analysis method according to claim 1, further comprising:
    calibrating the relationship of periodic spacing and brightness of each of the images based on a baseline before obtaining the wavelength values from the relationship of periodic spacing and brightness at the predetermined brightness value and after extracting the series of brightness values that have the relationship of periodic spacing and brightness from each of the images.

7. The image analysis method according to claim 1, further comprising:
   normalizing the relationship of periodic spacing and brightness of each of the images before obtaining the wavelength values from the relationship of periodic spacing and brightness at the predetermined brightness value and after extracting the series of brightness values that have the relationship of periodic spacing and brightness from each of the images.

8. The image analysis method according to claim 1, wherein a plot of the series of the brightness values shows an asymmetric line-shape peak, and each of the wavelength values is located at one side of the asymmetric line-shape peak.

9. The image analysis method according to claim 1, wherein the light beam illuminates the nanostructure pixel sensor from a small angle between the light beam and a surface of the nanostructure pixel sensor, and the small angle is less than 10°.

10. The image analysis method according to claim 1, wherein the light beam is emitted from a side of the nanostructure pixel sensor opposite away from the nanostructure pixels, and the nanostructure pixel sensor is transparent or semi-transparent.

11. The image analysis method according to claim 1, wherein the light beam is emitted from a side of the nanostructure pixel sensor, the images of the nanostructure pixel sensor are captured from an opposite side of the nanostructure pixel sensor, and the nanostructure pixel sensor is transparent or semi-transparent.

12. The image analysis method according to claim 1, wherein a metallic thin film of the nanostructure pixels has a thickness within a range of 40 to 60 nm.

13. The image analysis method according to claim 1, wherein the periodic spacings are in a range of 400 nm to 900 nm and a wavelength of the light beam is in a range of 400 nm to 900 nm.

14. The image analysis method according to claim 1, wherein determining the sensing process based on the wavelength shift of the wavelength values determines a presence and/or amount of the analyte captured on the nanostructure pixel sensor.

15. The image analysis method according to claim 14, wherein images of a known analyte are compared to determines the presence and/or amount of the analyte captured on the nanostructure pixel sensor.

16. The image analysis method according to claim 1, wherein the nanostructure pixels include the periodic nanostructures arranged in different periodic directions.

17. The image analysis method according to claim 1, wherein each of the nanostructure pixels includes a plurality of arrays of the periodic nanostructures, and each of the arrays of the periodic nanostructures has a different periodic spacing.

* * * * *